United States Patent [19]

Buck et al.

[11] Patent Number: 4,530,652

[45] Date of Patent: Jul. 23, 1985

[54] ASPHALT COMPOSITION

[76] Inventors: Ollie G. Buck; Floyd E. Naylor, both of Suite 1107, 1825 K St., NW., Washington, D.C. 20006

[21] Appl. No.: 570,107

[22] Filed: Jan. 12, 1984

[51] Int. Cl.³ .................. B32B 11/10; C08L 53/02; C08L 95/00
[52] U.S. Cl. ................... 428/291; 428/141; 524/68
[58] Field of Search ............ 524/68; 428/291, 141

[56] References Cited

U.S. PATENT DOCUMENTS

| 3,301,840 | 1/1967 | Zelinski | 260/94.2 |
|---|---|---|---|
| 3,639,521 | 2/1972 | Hsieh | 260/880 |
| 4,032,491 | 6/1977 | Schoenke | 260/28.5 AS |
| 4,035,444 | 7/1977 | Iwasaki et al. | 428/291 |
| 4,129,541 | 12/1978 | Marrs et al. | 260/28.5 AS |
| 4,158,371 | 6/1979 | Reusser et al. | 138/145 |
| 4,196,115 | 4/1980 | Bresson | 260/28.5 B |
| 4,217,259 | 8/1980 | Bresson | 260/28.5 AS |
| 4,430,465 | 2/1984 | Abbott | 428/291 |

Primary Examiner—Allan M. Lieberman

[57] ABSTRACT

Asphalt compositions having improved physical properties are prepared by blending into an asphalt a high vinyl rubbery polymer such as a conjugated diene/-monovinyl aromatic block copolymer wherein the conjugated diene blocks contain at least about 25 percent 1,2 addition (or vinyl unsaturation based on total diene content).

19 Claims, No Drawings

ASPHALT COMPOSITION

This invention relates to asphalt compositions of improved properties. This invention also relates to compositions containing asphalt and a rubbery polymer. In accordance with another aspect, this invention relates to a composition comprising asphalt and a minor amount of a conjugated diene/monovinyl aromatic block copolymer having at least about 25 percent 1,2 addition (or vinyl unsaturation) based on total diene content. Furthermore, this invention relates to an asphalt and a minor amount of a dispersable conjugated diene/monovinyl aromatic radial teleblock copolymer composition wherein the copolymer used has a sufficient vinyl unsaturated content so as to improve the physical properties of the composition, making it suitable for waterproofing applications.

Asphalt compositions consisting of an asphalt component and a polymer have been described in the literature for various applications such as joint fillers, adhesives, protective layers, impregnating agents and roofing materials. Among such disclosures is U.S. Pat. No. 4,196,115 (incorporated herein by reference) issued Apr. 1, 1980, which describes a roofing and waterproofing membrane comprised of asphalt and two copolymers each having a conjugated diene/monovinyl aromatic ratio of 50/50 to 85/15 with one copolymer having a Mw above 200,000 and the other copolymer having a Mw below 200,000. The polymers of said patent are prepared according to U.S. Pat. No. 3,639,521. Though there is no mention of polymer vinyl content nor its effect on the properties of asphalt, the polymer is prepared in the presence of a small amount of a polar material such as tetrahydrofuran (THF). The role of THF affecting percent vinyl content of the polymer is not mentioned in these two patents but the effect of THF on increasing vinyl content is commonly known elsewhere in the art. The amount of THF in these patents is not enough to produce a sufficiently high percent vinyl content to be very useful in the instant invention.

Rubber modified asphalt for roofing membranes, roofing shingles, and water barriers is a rapidly-growing area, particularly in Europe and more recently in the U.S. where a new type of roofing, the single-ply membrane, is beginning to replace the four-ply built-up roofing normally used on commercial structures. This membrane consists of a rubber-modified asphalt (containing up to about 15 weight percent rubber) coated onto a high modulus, non-woven, polyester fabric. These new development applications have placed a high demand on the type of rubber used. For example, the rubber needs to dissolve more rapidly and be compatible in the asphalt. In addition, the rubber needs to contribute to improved high and low temperature properties and flexibility. These properties have not been adequately provided by the prior art.

It is an object of this invention to produce asphalt compositions having improved physical properties.

It is another object of this invention to provide an asphalt-rubber composition having improved physical properties making it suitable for use as a roofing and/or a waterproofing membrane.

Other aspects, concepts and objects, as well as the several advantages of this invention will become apparent upon a study of the specification and the appended claims.

In accordance with the invention, there is provided a composition suitable for use as a roofing and/or waterproofing membrane having improved physical properties which comprises; an asphalt and an effective amount of a dispersable rubbery conjugated diene/monovinyl aromatic block copolymer having a vinyl content of at least about 25 percent which amount is sufficient to improve at least one of, high temperature flow resistance, low temperature break resistance, flexibility, viscosity, and percent recovery.

In accordance with another embodiment of the invention, a process is provided for improving the performance properties such as high temperature flow resistance, low temperature break resistance, flexibility, viscosity, percent recovery, and the like, of asphalts which comprises incorporating therein a minor effective amount of at least one high vinyl rubbery copolymer which amount is sufficient to improve at least one of said properties.

Physical properties of the asphalts used in this invention can vary widely even from the same source and the asphalts used in the examples are in no way intended to limit the invention. Asphalt properties that are more or less typical and can be used as exemplary of the type of asphalts useful in this invention are: penetration grade at 25° C. between about 100 and 300; viscosity at 177° C., between about 10 and 80 centipoise; and softening point, between about 40° and 60° C.

The polymers useful in this invention are any conjugated diene/monovinyl aromatic block copolymers that are dispersable in asphalt and are made by known methods that produce high 1,2-addition (or vinyl unsaturation) as disclosed in U.S. Pat. No. 3,301,840 the disclosure of which is incorporated herein by reference.

The conjugated diene monomer can have 4 to 8 carbon atoms (e.g., butadiene and isoprene) and the monovinyl-substituted aromatic monomer can have 8 to 12 carbon atoms (e.g., styrene).

The conjugated diene/monovinyl aromatic copolymer used in this invention has a monomer weight ratio in the approximate range 50/50 to about 85/15, a weight average molecular weight (Mw): number average molecular weight (Mw) ratio in the approximate range 100,000–500,000: 75,000–400,000, a percent in asphalt of at least about 10 weight percent, preferably about 10–25 weight percent, and a vinyl content of at least about 25 percent, preferably in the approximate range 25–50 percent. Percent vinyl content of the polymer is based on the amount of conjugated diene that undergoes 1-2 addition (Reaction 1) over the total conjugated diene in the polymer (Reaction 1+Reaction 2).

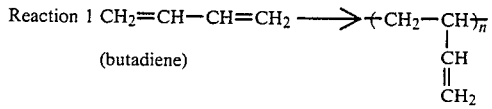

Reaction 1 (butadiene)

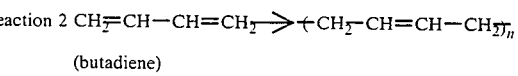

Reaction 2 (butadiene)

The preferred copolymers are butadiene/styrene block copolymers with the monomer weight ratio in the range 60/40 to about 70/30, the number average molecular weight between about 150,000–250,000, the vinyl content about 40 percent (based on total diene monomer content) and the weight percent is asphalt of about 15 percent.

The block copolymers are sequentially polymerized in the presence of an organolithium initiator. These polymers are represented by the general formula $(AB)_nZ$ where A is the polyvinyl aromatic segment, B is the polyconjugated diene portion, Z is the coupling agent residue, and n is 2, 3, or 4. These polymers are prepared by conducting the polymerization in the presence of a significant amount of a polar compound such as tetrahydrofuran similar to the procedure described in U.S. Pat. No. 3,301,840.

The diene polymerization step for the copolymers that are used in the examples was conducted at 70° C. according to the recipe of Table I. At this temperature, 3.5 parts of tetrahydrofuran per one hundred parts total monomer was sufficient to produce 40 percent 1,2 addition in the polybutadiene block. The polymer lithium was coupled with silicon tetrachloride.

TABLE I

POLYMERIZATION RECIPE

| | Parts |
|---|---|
| Step 1 | |
| Cyclohexane | 780 |
| Styrene | variable |
| Tetrahydrofuran | 3.5 (per 100 parts total monomer) |
| n-Butyllithium | variable |
| 10 minutes at | 70° C. |
| Step 2 | |
| Butadiene | variable |
| 30 minutes at | 70° C. |
| Step 3 | |
| Silicon tetrachloride | variable |
| 5 minutes at | 70° C. |

High shear mixers are the preferred equipment used to prepare the asphalt-rubber compositions of the present invention. However, the proper choice or selection of adequate mixing or blending equipment is left to the formulator.

Those skilled in the art will recognize that the proper selection of types and concentrations of asphalt and rubber depend on the type of applications but can be whatever is necessary to maintain satisfactory performance and physical properties such as hardness and melt flow. However, the most useful application for the compositions of this invention would be for use as impermeable membranes for roofs, etc. Asphalt-rubber compositions containing comparable polymers but with lower vinyl content used for impermeable membranes do not have as desirable physical properties as the compositions of the present invention.

The compositions of the present invention can also contain other materials such as mineral aggregates, mineral fillers, fibrous fillers, extender oils, etc. providing, of course, that the properties of the final composition are within the specification limits as herein described.

The examples following should be taken as exemplary and not exclusive in illustrating the invention.

EXAMPLE I

This example is a control describing the procedures used to prepare and test the rubber-asphalt compositions disclosed herein. To a stainless steel beaker partially immersed in a hot oil bath (204° C., 400° F.) was added 215 grams of an asphalt flux (Type 1A obtained from Tamko Asphalt Products Inc., viscosity 78 centipoise at 350° F., 81.6 pen at 77° F., Ring and Ball of 52° C.). After reaching the desired temperature, the asphalt was stirred at 1500 rpm using a 50 millimeter diameter three-blade paddle type stirrer with a blade pitch of approximately 35 degrees. To this hot stirred asphalt was added 35 grams of a 70 parts by weight butadiene/30 parts by weight styrene radial teleblock copolymer having 11 percent vinyl unsaturation and a $M_w/M_n$ of $300 \times 10^3/220 \times 10^3$ (Solprene 411 copolymer, Phillips Petroleum Co.). It took 1.5 hours for the rubber to dissolve. Solubilization was determined to be complete when no rubber particles could be observed in a thin film of the solution deposited on a paper towel with a spatula.

Viscosity of the rubber-asphalt composition was determined at 177° C. (350° F.) using a Brookfield viscometer model RVT-E equipped with a Thermosel and a Model 63A proportional temperature controller. Using a number 27 spindle, a viscosity of 16,075 centipoise at 350° F. was obtained.

A penetration of 43.3 was obtained using a standard penetrometer at 25° C. according to test method ASTM D5-71.

Ring and Ball of 135° C. was measured using a standard ring and ball apparatus according to test method ASTM D36-76.

Flow was measured by placing a molded block (40 millimeters × 60 millimeters × 3 millimeters) of the rubber-asphalt composition on a metal reinforced poster board strip (305 millimeters long). The strip and block was placed at a 75° angle in an oven at 100° C. After five hours the block and strip was removed and the length of movement (or flow) was measured. In this manner, a flow of 0.5 millimeters was measured.

Low temperature resistance to break was measured on three-millimeter thick samples preconditioned at a given temperature and bent over a ⅜ inch diameter mandrel. Measurements were made at 5° C. increments and the temperature at which the specimen broke was reported as the low temperature fail point. A temperature fail point of −25° C. was thus obtained.

Permanent Set was obtained by elongating a one-inch "dog bone" specimen either 100 percent or 300 percent at 25° C. for 25 hours, then allowing the sample to recover for 24 hours at 25° C. The percent recovery was then calculated. At 100 percent elongation, the recovery was 87 percent. At 300 percent elongation, the sample broke.

EXAMPLE II

This example is the invention and illustrates the improvement in properties when a similar type copolymer but having a higher vinyl content is used. The procedure described in Example I was repeated except the copolymer was replaced with a similar but higher vinyl content copolymer. These results are listed in Table II where it can be seen that copolymers having increased vinyl content (e.g. 33, 40, 45 percent copolymers B, C and D respectively) dissolve faster in the asphalt compared to the lower vinyl content copolymer (copolymer A). In addition, compositions based on copolymers B, C and D have much lower viscosities making them easier to handle. They have, in general, better high temperature resistance (flow), better low temperature resistance (low temperature break point) and better percent recovery at either 100 percent or 300 percent elongation.

TABLE II

Effect of Vinyl Content on Performance Properties of Butadiene/Styrene Copolymer-Asphalt Compositions Composition: 14 Wt. % Bd/Sty Copolymer
86 Wt. % Asphalt

| | Properties | 70 Bd/30 Sty Copolymers[a] | | | |
|---|---|---|---|---|---|
| | | Control A | Invention B | C | D |
| 1. | Solubilization Time, minutes | 90 | 30 | 45 | 40 |
| 2. | Viscosity, Cps., 350° F. | 16,075 | 11,375 | 8137 | 8337 |
| 3. | Penetration at 77° F. | 43.3 | 36 | 33 | 34 |
| 4. | Ring and Ball, °C. | 135 | 133 | 132 | 118 |
| 5. | Flow 100° C./5 hrs, 75° angle, mm | 0.5 | 0 | 0 | 1 |
| 6. | Low Temp. Break Point, °C. | −25 | −40 | −35 | −30 |
| 7. | % Recovery at 100% Elongation | 87 | 100 | 100 | 100 |
| | % Recovery at 300% Elongation | Broke | 94 | 89 | 94 |

| [a]Copolymer | % Vinyl | Mw × 10³/Mn × 10³ |
|---|---|---|
| A | 11 | 300/220 |
| B | 33 | 240/193 |
| C | 40 | 234/175 |
| D | 45 | 244/192 |

EXAMPLE III

This example illustrates the affect of the butadiene/styrene monomer ratio and molecular weight on the copolymer-asphalt composition for copolymers with the same vinyl content (40 percent). These results are listed in Table III. It is seen that, in general, low temperature properties are best at high butadiene levels (e.g. 80 parts, Runs 13 to 20) but these compositions have unsatisfactory high temperature properties (flow). High temperature properties (flow) are best when the butadiene-to-styrene ratio is 60:40 (Runs 1 to 8). However, viscosities are high making the composition more difficult to handle. It appears that the best rubber for asphalt modification is a radial teleblock copolymer containing 30 to 40 percent styrene and 40 percent vinyl unsaturation with a number average molecular weight between 150,000 and 250,000.

TABLE III

Effect of Monomer Ratio and Molecular Weight on the Performance Properties of Butadiene/Styrene Copolymer-Asphalt Compositions Composition: 14 Wt. Bd/Sty Copolymer (40% Vinyl)
86% W. % Asphalt

| Run No. | Bd/Sty Monomer Ratio | $M_n \times 10^3$ | Sol. Time Minutes | Visc. 350° F. cps | Ring & Ball, °C. | Flow 100° C. 75° Angle, 5 Hrs. mm | % Recovery | Mandrel Bend Fail., °C. |
|---|---|---|---|---|---|---|---|---|
| 1 | 60/40 | 185 | 60 | 17,750 | 143.5 | 3 | 100 | −25 |
| 2 | " | 185 | 60 | 18,075 | 144 | 2 | 100 | −35 |
| 3 | " | 203 | 50 | 6,138 | 138.5 | 0 | 100 | −25 |
| 4 | " | 203 | 50 | 6,350 | 138.5 | 0 | 100 | −35 |
| 5 | " | 206 | 65 | 19,075 | 157 | 0 | 100 | −35 |
| 6 | " | 206 | 65 | 19,125 | 156.5 | 0 | 100 | −30 |
| 7 | " | 225 | 55 | 20,175 | 156 | 55 | 100 | −25 |
| 8 | " | 225 | 55 | 19,075 | 156 | 100 | 100 | −25 |
| 9 | 70/30 | 167 | 52 | 3,275 | 122 | 193/2 hrs | 100 | −25 |
| 10 | " | 167 | 52 | 3,355 | 122 | 195/2 hrs | 100 | −30 |
| 11 | " | 179 | 60 | 10,250 | 132.5 | 157 | 100 | −30 |
| 12 | " | 179 | 60 | 10,125 | 132 | 75 | 100 | −30 |
| 13 | 80/20 | 165 | 50 | 3,225 | 97.5 | 190/1.2 hrs | 100 | −35 |
| 14 | " | 165 | 50 | 3,300 | 99.5 | 188/1.2 hrs | 100 | −35 |
| 15 | " | 176 | 55 | 8,250 | 118 | 205/1.5 hrs | 94 | −30 |
| 16 | " | 176 | 55 | 8,313 | 117.5 | 210/1.5 hrs | 94 | −35 |
| 17 | " | 179 | 45 | 11,000 | 102 | 125/2 hrs | 94 | −30 |
| 18 | " | 179 | 45 | 11,625 | 102 | 123/2 hrs | 88 | −35 |
| 19 | " | 190 | 60 | 17,000 | 120 | 223/2 hrs | 94 | −30 |
| 20 | " | 190 | 60 | 16,500 | 119 | 200/2.5 hrs | 100 | −35 |

We claim:

1. An asphalt composition with improved physical properties comprising an asphalt and conjugated diene/monovinyl aromatic block copolymer which is dispersable in asphalt, wherein the copolymer has a vinyl content of at least about 25 percent based on total diene content, and said aromatic block copolymer is present in a minor amount effective to improve at least one of dispersability in asphalt, viscosity, high temperature flow resistance and low temperature break resistance.

2. An asphalt composition according to claim 1 wherein the conjugated diene-to-monovinyl aromatic monomer ratio can vary from about 50:50 to about 85:15.

3. An asphalt composition with improved performance properties comprising an asphalt and a minor effective amount of about 10 to about 25 weight percent of a dispersable conjugated diene/monovinyl aromatic block copolymer wherein the copolymer has a vinyl content of at least about 25 percent based on total diene content.

4. An asphalt composition according to claim 1 wherein the conjugated diene monomer has 4 to 8 carbon atoms and the monovinyl aromatic monomer has 8 to 12 carbon atoms.

5. An asphalt composition according to claim 1 wherein the conjugated diene monomer of the block copolymer is selected from butadiene and isoprene and the monovinyl aromatic monomer is styrene.

6. An asphalt composition comprising an asphalt and about 10–20 weight percent of butadiene/styrene radial teleblock copolymer with the butadiene to styrene monomer ratio from about 50/50 to about 85/15, a percent vinyl unsaturation of about 25–50 percent, based on total diene content, and a number of average molecular weight between about 150,000 to about 250,000.

7. An asphalt composition according to claim 6 wherein the weight percent of copolymer is about 15 percent.

8. An article of manufacture comprising an asphalt composition according to claim 6 coated on a nonwoven fabric.

9. An asphalt composition according to claim 6 wherein the composition contains fillers.

10. An asphalt composition according to claim 6 wherein the composition contains mineral aggregates.

11. A method for producing asphalt compositions suitable for use as a roofing material or as a waterproofing membrane which comprises admixing a copolymer as defined in claim 1 with an asphalt to improve the performance properties of said asphalt, wherein said copolymer is added in a minor amount effective to improve at least one of dispersability in asphalt, viscosity, high temperature flow resistance and low temperature break resistance.

12. A method according to claim 11 wherein the copolymer is a butadiene/styrene copolymer and the amount ranges from about 10 to about 25 weight percent.

13. A method for producing asphalt compositions suitable for use as a roofing material or as a water proofing membrane which comprises admixing about 10-25 weight percent of a copolymer of claim 6 with an asphalt.

14. A method according to claim 13 wherein the weight percent of copolymer in asphalt is about 15 percent and the copolymer is a butadiene/styrene block copolymer.

15. An article of manufacture suitable for use as a roofing material or as a water proofing membrane which comprises a coating of a rubber-modified asphalt composition of claim 6 on a non-woven fabric.

16. An asphalt composition comprising an asphalt and at least about 10 weight percent of a dispersable conjugated diene/monovinyl aromatic radial teleblock copolymer with the conjugated diene monomer having 4 to 8 carbon atoms and the monovinyl aromatic monomer having 8 to 12 carbon atoms, the conjugated diene/monovinyl aromatic monomer ratio from about 50/50 to about 85/15, a percent vinyl unsaturation of at least above 25 percent based on total diene content, and a weight average molecular weight (Mw)/number average molecular weight (Mn) ratio in the range of about 100,000–500,000/75,000–400,000.

17. An asphalt composition according to claim 16 wherein the radial teleblock copolymer is butadiene/styrene with the monomer weight ratio in the range of about 60/40 to about 70/30, and a vinyl content of about 40 percent based on total diene content.

18. An asphalt composition comprising an asphalt and at least about 10 weight percent of a conjugated diene/monovinyl aromatic block copolymer with a vinyl content of at least about 25 percent based on total diene content and of the type to improve at least one of dispersability in asphalt, viscosity, high temperature flow resistance and low temperature break resistance.

19. A method for producing asphalt compositions suitable for use as a roofing material or as a waterproofing membrane, which comprises admixing a copolymer as defined in claim 16 with an asphalt in a minor amount effective to improve at least one of dispersability in asphalt, viscosity, high temperature flow resistance and low temperature break resistence.

* * * * *

UNITED STATES PATENT AND TRADEMARK OFFICE
CERTIFICATE OF CORRECTION

PATENT NO. : 4,530,652
DATED : July 23, 1985
INVENTOR(S) : Ollie G. Buck et al.

It is certified that error appears in the above-identified patent and that said Letters Patent is hereby corrected as shown below:

Column 6, claim 6, line 30, "10-20" should read -- 10-25 --.

Signed and Sealed this

Fourth Day of February 1986

[SEAL]

Attest:

DONALD J. QUIGG

Attesting Officer

Commissioner of Patents and Trademarks